(12) United States Patent
Gerke et al.

(10) Patent No.: US 8,950,048 B2
(45) Date of Patent: Feb. 10, 2015

(54) PLANET CARRIER SALVAGE PROCESS

(71) Applicant: Caterpillar Inc., Peoria, IL (US)

(72) Inventors: Daniel Herbert Gerke, Chillicothe, IL (US); Daniel Thomas Cavanaugh, Chillicothe, IL (US); Kristin Ann Schipull, Moorehead, MN (US); M. Brad Beardsley, Laura, IL (US); Justin Curtis Embrey, Mortin, IL (US)

(73) Assignee: Caterpillar Inc., Peoria, IL (US)

( * ) Notice: Subject to any disclaimer, the term of this patent is extended or adjusted under 35 U.S.C. 154(b) by 135 days.

(21) Appl. No.: 13/682,182

(22) Filed: Nov. 20, 2012

(65) Prior Publication Data

US 2014/0141930 A1    May 22, 2014

(51) Int. Cl.
   *B23P 6/00*      (2006.01)
   *F16H 57/08*     (2006.01)
   *B23K 26/34*     (2014.01)
   *B23K 26/32*     (2014.01)

(52) U.S. Cl.
   CPC .............. *F16H 57/082* (2013.01); *B23K 26/34* (2013.01); *B23K 26/3206* (2013.01)
   USPC .................. 29/402.13; 29/402.16; 29/402.18; 427/8; 427/596; 427/597; 475/331

(58) Field of Classification Search
   USPC ............ 29/402.13, 402.16, 402.18; 118/641, 118/708, 712; 427/8, 596, 597; 475/331
   See application file for complete search history.

(56) References Cited

U.S. PATENT DOCUMENTS

| | | | |
|---|---|---|---|
| 2009/0291197 A1 | 11/2009 | Bartels et al. | |
| 2013/0337215 A1* | 12/2013 | Sharp et al. | 428/63 |
| 2014/0287165 A1* | 9/2014 | Cavanaugh et al. | 427/597 |

FOREIGN PATENT DOCUMENTS

| | | |
|---|---|---|
| CN | 101974747 | 10/2011 |
| CN | 102168210 | 7/2012 |
| DE | 10334880 | 3/2005 |

OTHER PUBLICATIONS

U.S. Appl. No. 13/681,954, entitled, "Component with Cladding Surface and Method of Applying Same," filed Nov. 20, 2012.
U.S. Appl. No. 13/682,083, entitled, "Component With Cladding Surface and Method of Applying Same," filed Nov. 20, 2012.

* cited by examiner

*Primary Examiner* — Alexander P Taousakis
(74) *Attorney, Agent, or Firm* — Finnegan, Henderson, Farabow, Garrett & Dunner LLP

(57) ABSTRACT

A remanufactured planet carrier is disclosed having a first plate and a second plate spaced apart from and oriented generally parallel to the first plate. Supports join and support the first and second plates. The remanufactured planet carrier further has a plurality of first pin bores in the first plate and a plurality of second pin bores in the second plate. The first pin bores are parallel and generally aligned with the second pin bores. A cylindrical member extends from a central axis of the second plate away from the first plate with a shaft bore formed within the cylindrical member. The first and second pin bores and the shaft bore each have a surface layer with a hardness of at least about 180 BHN and a strength of at least about 500 MPa.

12 Claims, 2 Drawing Sheets

PLANET CARRIER SALVAGE PROCESS

TECHNICAL FIELD

The present disclosure relates generally to a salvage process and, more particularly, to a process for salvaging a planet carrier.

BACKGROUND

Commercial wind turbines contain a large planet carrier with smaller internal diameter pin bores arranged around a larger internal diameter main bore. Over time, both the pin bores and the main bore wear out. The surfaces of the bores become pitted and corroded, requiring replacement of the planet carrier.

Replacement of the planet carrier is costly. Remanufacturing of the surfaces of the internal diameter bores can be less costly than replacing the entire planet carrier.

Attempts to remanufacture the planet carrier include remanufacturing the surfaces of the bores with plasma transfer arc welding. The plasma transfer arc welding process first preheats the planet carrier and deposits a new layer of metal over the surfaces of the internal diameter bores.

The plasma transfer arc welding process, however, produces remanufactured surfaces that are prone to cracking under strain because the new metal layer is deposited at high temperature, which creates stress and reduces strength in the heat effected zone. The plasma transfer arc welding process also requires preheating of the large planet carrier, which uses a large amount of energy, time and labor to perform.

The remanufactured planet carrier of the present disclosure solves one or more of the problems set forth above and/or other problems in the art.

SUMMARY

In one aspect, the present disclosure is directed to a remanufactured planet carrier. The remanufactured planet carrier may include a first plate and a second plate spaced apart and oriented generally parallel to the first plate. Supports may join and support the first and second plates. The remanufactured planet carrier further includes a plurality of first pin bores in the first plate and a plurality of second pin bores in the second plate. The first pin bores are parallel and generally aligned with the second pin bores. The planet carrier also includes a cylindrical member extending from a central axis of the second plate away from the first plate, with a shaft bore formed within the cylindrical member. The first and second pin bores and the shaft bore each include a surface layer deposited by laser cladding. Each surface layer of the first and second pin bores and the shaft bore has a hardness of at least about 180 Brinell Hardness Number (BHN) and a strength of at least about 500 MPa.

In another aspect, the present disclosure is related to a method of remanufacturing a planet carrier. The method may include removing a waste layer of metal from each of a plurality of pin bores and a shaft bore. The method may also include laser cladding a surface layer on each of the plurality of pin bores and the shaft bore. The method may also include removing a fitting layer from the surface layer of each of a plurality of pin bores and the shaft bore. The diameter of each of the plurality of pin bores may be between about 4 and 15 inches, and the diameter of the shaft bore may be between about 15 and 25 inches.

DETAILED DESCRIPTION

Figure 1:
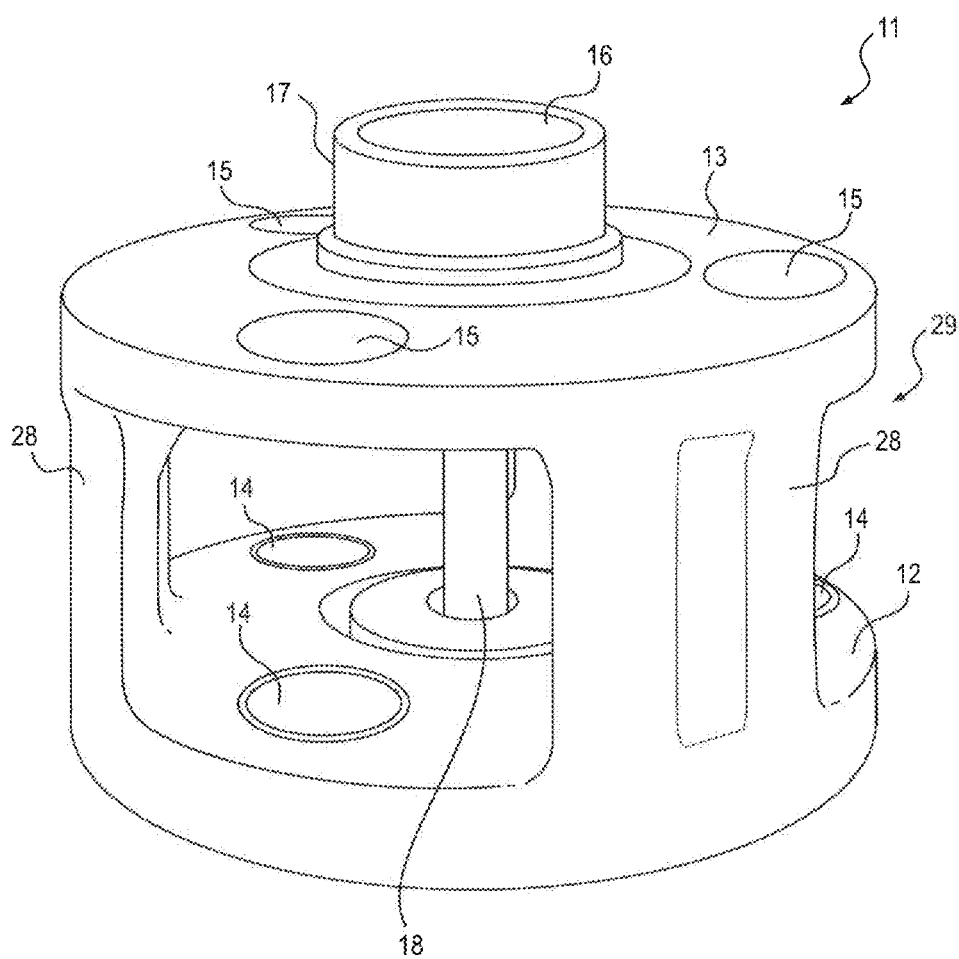
FIG. 1 is a diagrammatic illustration of an exemplary disclosed remanufactured planet carrier for a wind turbine.

FIG. 1 illustrates a remanufactured planet carrier 11 according to the present disclosure. Remanufactured planet carrier 11 may be used in a gear box of a wind turbine. For example, remanufactured planet carrier 11 may be part of the gear box and attached to a main shaft of the wind turbine. The remanufactured planet carrier 11 may alternatively be used in another type of machine that uses a gear box including a planet carrier.

Planet carrier 11 may include a first plate 12 on one end of the planet carrier 11 and a second plate 13 on an opposite end of the planet carrier 11. Second plate 13 may be spaced apart and oriented generally parallel to first plate 12. An empty space 29 may separate first plate 12 and second plate 13. Supports 28 may connect first plate 12 and second plate 13 and provide a structural rigidity to planet carrier 11. When planet carrier 11 is used in the gear box of a wind turbine, gears (not shown) are placed in empty space 29 between first plate 12 and second plate 13. Planet carrier 11 and the gears work together with other components in the wind turbine to convert physical energy into electricity.

In one embodiment, empty space 29 between first plate 12 and second plate 13 may have an axial length of between about 10 to 20 inches in order to have sufficient space to fit gears and components required in the gear box of the wind turbine. First plate 12 and second plate 13 may have an outer diameter of about 40 to 60 inches and a thickness of between about 3 to 6 inches. Supports 28 may have an axial length of about 10 to 20 inches.

Planet carrier 11 may be made of ductile iron. In one embodiment, the ductile iron may include carbon, silicon, manganese, magnesium, phosphorus, sulfur, and iron. In another embodiment the ductile iron may include a molar composition of about 3.3 to 3.4% carbon, 2.2 to 2.8% silicon, 0.1 to 0.5% manganese, 0.03 to 0.05% magnesium, 0.005 to 0.04% phosphorus, 0.005 to 0.02% sulfur, with a balance of iron. In a further embodiment, the ductile iron may include copper or tin to increase tensile and yield strength while simultaneously reducing elongation. In another embodiment, the ductile iron may include improved corrosion resistance by replacing about 15% to 30% of the iron in the alloy with nickel, copper, or chromium.

Planet carrier 11 may further include a plurality of first pin bores 14 in first plate 12. First pin bores 14 may pass entirely through the thickness of first plate 12. First pin bores 14 may be oriented in first plate 12 such that each bore is substantially equally spaced in a radial direction relative to a center 18 of first plate 12. First pin bores 14 may be oriented in first plate 12 such that each bore is at a substantially equal distance from the center 18 of first plate 12 in the radial direction. In the disclosed embodiment, first plate 12 may include a total of between 3 and 6 first pin bores. Other embodiments may include any number of pin bores.

Planet carrier 11 may further include a plurality of second pin bores 15 in second plate 13. Second pin bores 15 may pass entirely through the thickness of second plate 13. In another embodiment (not shown), second pin bores 15 may pass only partially through the thickness of second plate 13. When second pin bores 15 pass only partially through the thickness of second plate 13, the second pin bore openings face first plate 12. Second pin bores 15 may be oriented in second plate 13 such that each bore is substantially equally spaced in the radial direction relative to center 18 of second plate 13. Second pin bores 15 may be oriented in second plate 13 such that each bore is at a substantially equal distance from the center of second plate 13 in the radial direction. Second plate 13 may include a total of between 3 and 6 first pin bores, and the total number of pin bores in second plate 13 may include the same number of bores as first plate 12. Second pin bores 15 may be generally aligned with first pin bores 14.

First pin bores 14 and second pin bores 15 may have dimensions sufficient to hold pins (not shown) that pass through first pin bores 14 and second pin bores 15. The pins may be used to mount gears (not shown) in space 29 between first plate 12 and second plate 13. To sufficiently hold the pins, first pin bores 14 and second pin bores 15 may each have a diameter of between about 3.5 and 15 inches. First pin bores 14 and second pin bores 15 may further each have a length of between about 4 and 8 inches.

Planet carrier 11 may also include a cylindrical member 17 extending from a central axis of second plate 13, and away from first plate 12. Cylindrical member 17 may include a shaft bore 16 to hold the main shaft (not shown) of a wind turbine. Shaft bore 16 may have a length of between about 5 and 39 inches and a diameter of between about 15 and 25 inches. Cylindrical member 17 may have a wall thickness of between 0.5 and 3.5 inches.

To arrive at remanufactured planet carrier 11, each bore of a spent planet carrier may be reconditioned because the bores have become pitted, corroded, and/or misshapen from use and wear. Remanufactured planet carrier 11 may have had a waste layer of metal removed from each of first pin bores 14, second pin bores 15, and shaft bore 16. The waste layers of metal may include surfaces of each of first pin bores 14, second pin bores 15, and shaft bore 16. The waste layer of metal removed from each of first pin bores 14, second pin bores 15, and shaft bore 16 may have a thickness of between about 0.01 mm to 2 mm.

First pin bores 14, second pin bores 15, and shaft bore 16 each may further include a new surface layer of metal that has been deposited on the surface of each bore by laser cladding. Each surface layer of metal may have a thickness of between about 0.2 mm and 6 mm.

Each surface layer may include at least one of a ferrous based steel, or a nickel based alloy. In one embodiment, each surface layer may be made of a ferrous based steel, for example cast 1040 steel or 316 stainless steel. In another embodiment, each surface layer may be made of a ferrous based steel with a molar composition of about 0 to 1% carbon, 0 to 20% chromium, 0 to 2% manganese, 0 to 30% nickel, 0 to 2% silicon, and a balance of iron. In an alternative embodiment, each surface layer may be made of a nickel based alloy with a molar composition of about 0 to 30% chromium, 0 to 3% manganese, 0 to 30% molybdenum, 0 to 40% copper, 0 to 40% iron, and a balance of nickel.

Each surface layer may have a hardness of at least about 180 BHN and a strength substantially equal to or greater than the strength of the material from which remanufactured planet carrier 11 is made. In one embodiment, each surface layer may have a hardness of at least about 200 BHN. In another embodiment, each surface layer may have a strength of at least about 500 MPa when the cladding layer includes 316 stainless steel. In another embodiment, each surface layer may have a strength of at least about 600 MPa when the cladding layer includes cast 1040 steel.

Further, to arrive at remanufactured planet carrier 11, each surface layer of first pin bores 14, second pin bores 15, and shaft bore 16 may be machined after cladding such that each of first pin bores 14 and second pin bores 15 can receive pins with a desired fit, and shaft bore 16 can receive the main shaft used in the wind turbine with a desired fit. Remanufactured planet carrier 11 may have a fitting layer of metal removed from each surface layer of first pin bores 14, second pin bores 15, and shaft bore 16. The fitting layer of metal removed from each of first pin bores 14, second pin bores 15, and shaft bore 16 may have a thickness of between about 0.01 mm to 2 mm.

INDUSTRIAL APPLICABILITY

The disclosed remanufactured planet carrier may have use in any wind turbine application or in any other apparatus that utilizes a planet carrier. The configurations of the disclosed reconditioned planet carrier embodiments may provide a number of benefits, including reducing the cost of maintaining a wind turbine. The process of remanufacturing planet earner 11 will now be described in detail.

The process of remanufacturing planet carrier 11 may include removing a waste layer of metal from each of a plurality of pin bores 14 and 15 and shaft bore 16 of a spent planet carrier. The waste layers of metal may include surfaces of each of pin bores 14 and 15 and shaft bore 16 of the spent planet carrier that have become pitted, corroded or misshapen from use and wear. The waste layer of metal removed from each of pin bores 14 and 15 and shaft bore 16 may have a thickness of between 0.01 mm to 2 mm.

Figure 2:
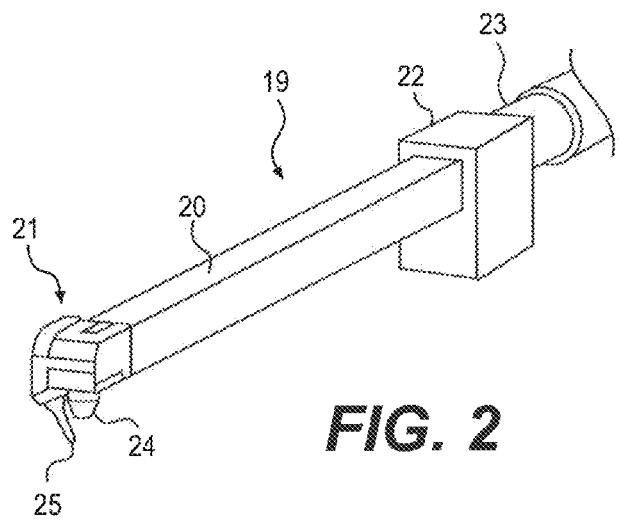
FIG. 2 is a diagrammatic illustration of an exemplary laser cladding tool that may be used with the disclosed method of remanufacturing of the planet carrier of FIG. 1.

The process of remanufacturing planet carrier 11 may further include laser cladding a new surface layer of metal on each of pin bores 14 and 15 and shaft bore 16. The new layer of metal may be deposited onto each of the plurality of pin bores 14 and 15 and shaft bore 16 with, for example, a laser cladding apparatus. An exemplary laser cladding apparatus is shown generally in FIG. 2.

Figure 3:
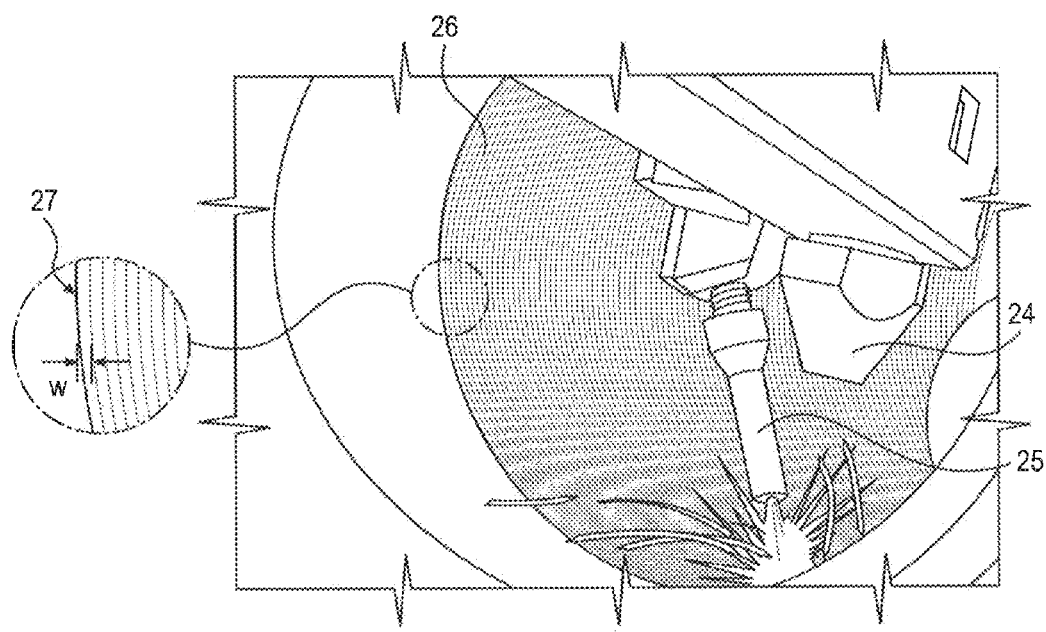
FIG. 3 is a diagrammatic illustration of an exemplary disclosed method of remanufacturing of a planet carrier.

Laser cladding apparatus 19 includes an elongated arm 20 connected to a cladding head 21. The end of elongated arm 20 opposite cladding head 21 attaches to a base 22. Base 22 connects laser cladding apparatus to a collimator 23. Collimator 23 is adapted to deliver a laser beam through a chamber defined inside elongated arm 20 and is coupled to a laser energy source (not shown). A diffuser nozzle 25 delivers cladding powder in a carrier gas. As shown in FIG. 3, the cladding powder exiting diffuser nozzle 25 contacts a laser exit opening 24. The laser beam melts the powder to form surface layer 26.

The cladding powder may include at least one of a ferrous based steel, or a nickel based alloy. In one embodiment, the cladding powder may be made of a ferrous based steel, for example cast 1040 steel or 316 stainless steel. In another embodiment, the cladding powder may include a molar composition of about 0 to 1% carbon, 0 to 20% chromium, 0 to 2% manganese, 0 to 30% nickel, 0 to 2% silicon, and a balance of iron. In an alternative embodiment, the cladding powder may include a molar composition of about 0 to 30% chromium, 0 to 3% manganese, 0 to 30% molybdenum, 0 to 40% copper, 0 to 40% iron, and a balance of nickel.

In one embodiment, the cladding powder may be delivered to diffuser nozzle 25 at a powder feed rate of between about 10 g/min and 60 g/min and the laser cladding may be performed at powers up to 3.0 kW and 5.0 kW using a diode/YAG laser.

To apply the new laser-clad layer of metal, cladding head 21 may remain stationary and planet carrier 11 may be rotated around the circumference and along the entire length of each of pin bores 14 and 15 and shaft bore 16. A clad track 27 may be deposited along a path as planet carrier 11 rotates along the circumference and passes across the entire length of each of pin bores 14 and 15 and shaft bore 16. The size of the clad track 27 may depend on the flow rate of cladding powder exiting diffuser nozzle 25. In one embodiment, a clad track 27 of a width, W, of about 5.5 mm may be formed during the process at a speed of between about 900 mm/min and 1500 mm/min. The process may further include passing the rotating planet carrier 11 along the entire length of each of pin bores 14 and 15 and shaft bore 16 one to three times per bore. Each pass may form a cladding layer with a thickness of about 0.2 mm to 2.0 mm.

The process may thereafter include removing a fitting layer from surface layer 26 of each of pin bores 14 and 15 and shaft bore 16. Each surface layer 26 of pin bores 14 and 15 and shaft bore 16 may be machined such that each of pin bores 14 and 15 receives pins with the desired fit and shaft bore 16 receives the main shaft with the desired fit. In one embodiment, the fitting layer removed from each of pin bores 14 and 15 and shaft bore 16 bore may be between 0.01 mm to 2 mm thick. After the fitting layer is removed from the surface layer 26 of pin bores 14 and 15 and shaft bore 16, surface layer 26 becomes generally smooth. In one embodiment, pin bores 14 and 15 and shaft bore 16 each may have a surface layer with a thickness of between 0.2 mm to 6 mm, after the fitting layer is removed.

The planet carrier remanufacturing process described above may be performed to recondition the surfaces of the internal diameter bores as a cost effective alternative to replacing an entire planet carrier in a wind turbine. The presently described remanufacturing process may be performed without preheating of the entire planet carrier and without creating heat effected zones that reduces the fatigue strength of the bore surfaces.

It will be apparent to those skilled in the art that various modifications and variations can be made to the disclosed planet carrier without departing from the scope of the disclosure. Other embodiments of the planet carrier will be apparent to those skilled in the art from consideration of the specification and practice of the planet carrier herein. It is intended that the specification and examples be considered as exemplary only, with a true scope of the disclosure being indicated by the following claims and their equivalents.

What is claimed is:

1. A method remanufacturing a planet carrier, comprising:
   removing a waste layer of metal from each of a plurality of pin bores and a shaft bore;
   laser cladding a surface layer on each of the plurality of pin bores and the shaft bore; and
   removing a fitting layer from each of the surface layers of the plurality of pin bores and the shaft bore, wherein:
      each of the plurality of pin bores have a diameter of between about 3.5 and 15 inches; and
      the shaft bore has a diameter of between about 15 and 25 inches.

2. The method of claim 1, wherein the laser cladding includes depositing at least one of a ferrous based steel, or a nickel based alloy.

3. The method of claim 1, wherein the laser cladding includes depositing a cladding powder in 1 to 3 passes.

4. The method of claim 3, wherein each pass forms a cladding layer with a thickness of about 0.2 mm to 2.0 mm.

5. The method of claim 4, wherein the cladding layer has a clad track width of about 5.5 mm.

6. The method of claim 1, wherein the laser cladding includes depositing a cladding layer at a cladding speed of between about 900 min/min and 1500 mm/min.

7. The method of claim 1, wherein the laser cladding includes depositing a cladding powder at a rate of between about 10 g/min and 60 g/min.

8. The method of claim 1, wherein each of the surface layers of the first and second pin bores and the shaft bore has a thickness of between 0.2 mm to 6 mm.

9. The method of claim 1, wherein each of the waste layers of metal from the first and second pin bores and the shaft bore is between about 0.01 mm to 2 mm thick.

10. The method of claim 1, wherein the laser cladding includes depositing a cladding powder with a molar composition of about 0 to 1% carbon, 0 to 20% chromium, 0 to 2% manganese, 0 to 30% nickel, 0 to 2% silicon, and a balance of iron.

11. The method of claim 1, wherein the laser cladding includes depositing a cladding layer having a hardness of at least about 180 BHN and a strength of at least about 500 MPa.

12. The method of claim 1, wherein each of the fitting layers removed from the first and second pin bores and the shaft bore is between about 0.01 mm to 2 mm thick.

* * * * *

UNITED STATES PATENT AND TRADEMARK OFFICE
CERTIFICATE OF CORRECTION

| | | |
|---|---|---|
| PATENT NO. | : 8,950,048 B2 | Page 1 of 1 |
| APPLICATION NO. | : 13/682182 | |
| DATED | : February 10, 2015 | |
| INVENTOR(S) | : Gerke et al. | |

It is certified that error appears in the above-identified patent and that said Letters Patent is hereby corrected as shown below:

Title Page, Column 1, Item 72 (Inventors), line 6, delete "Mortin," and insert -- Morton, --.

Signed and Sealed this
Fifteenth Day of March, 2016

Michelle K. Lee
*Director of the United States Patent and Trademark Office*